Nov. 22, 1960  F. O. LUENBERGER  2,961,208
ADJUSTABLE MOUNTING FOR ELECTRICAL MOTORS
Filed Feb. 4, 1958  2 Sheets-Sheet 1

INVENTOR.
FREDERICK O. LUENBERGER,
BY
Flam and Flam
ATTORNEYS.

Nov. 22, 1960 F. O. LUENBERGER 2,961,208
ADJUSTABLE MOUNTING FOR ELECTRICAL MOTORS
Filed Feb. 4, 1958 2 Sheets-Sheet 2
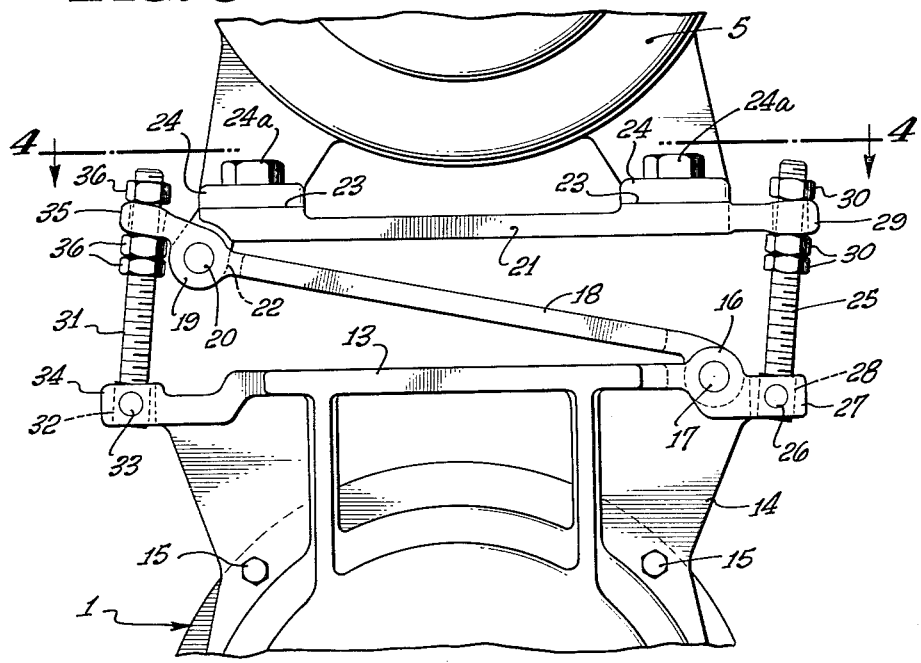
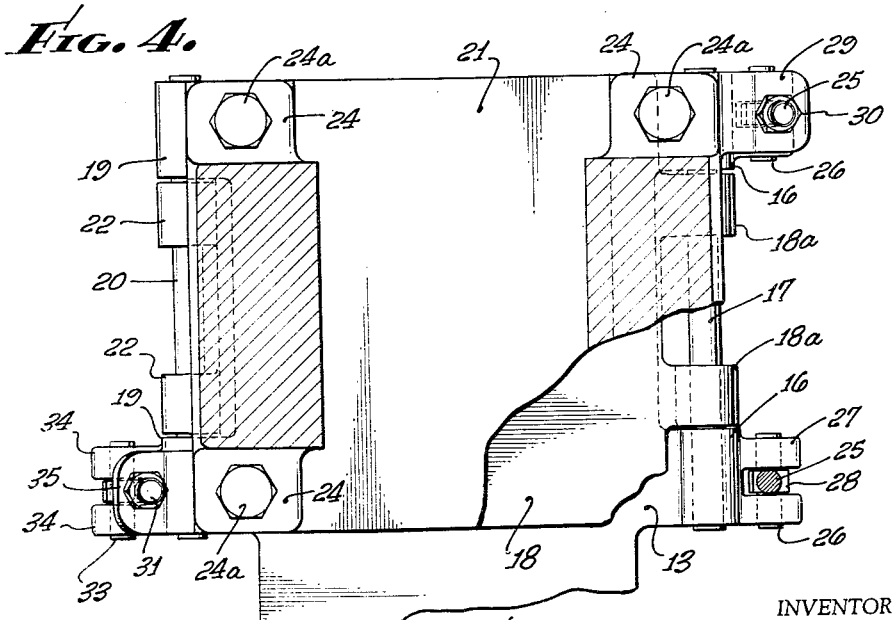
INVENTOR.
FREDERICK O. LUENBERGER
BY Flam and Flam
ATTORNEYS.

United States Patent Office 2,961,208
Patented Nov. 22, 1960

2,961,208

ADJUSTABLE MOUNTING FOR ELECTRICAL MOTORS

Frederick O. Luenberger, Los Angeles, Calif., assignor to U.S. Electrical Motors, Inc., Los Angeles, Calif., a corporation of California Filed Feb. 4, 1958, Ser. No. 713,163

2 Claims. (Cl. 248—16)

This invention relates to a base or mounting for a dynamo-electric machine.

It is common to provide single or multiple pulley and belt drives between a motor and a load, such as a variable ratio transmission mechanism. In such drives, a variety of belt-tightening devices are available. One such device is a mounting for the motor such that it may be moved away from its load so as to increase the distance between the axes of the driving and driven pulleys.

It is one of the objects of this invention to provide a simple and inexpensive base structure to effect such belt tightening, or to facilitate replacement of any of the belts associated with the drive.

It has been common in the past to provide a motor base pivotally mounted near one edge on an axis parallel with the motor axis. By angular adjustment of the base about its pivot, the center distance between the motor shaft and the load shaft can be adjusted. There are definite and important disadvantages to such a scheme. The maximum permissible angular adjustment is limited; the motor is supported on a sloping base, out of symmetrical alignment with the other elements.

It is accordingly another object of this invention to provide a pivotally adjustable base structure that materially extends the range of adjustment of the center distance.

In order to accomplish these results, the base is formed of serially pivotally joined elements, capable of being angularly adjustable with respect to adjacent elements. Thus they may be folded flat against each other, corresponding to a collapsed position, or they may be extended to form a zig-zag pattern. The angle between each member may be quite small, and yet the total extension may be quite large.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 3 is an enlarged fragmentary front elevation, showing the adjustable base for the electric motor used in the unit in a different position than in Fig. 1; and Fig. 4 is a sectional view taken along a plane corresponding to line 4—4 of Fig. 3.

Figure 1:
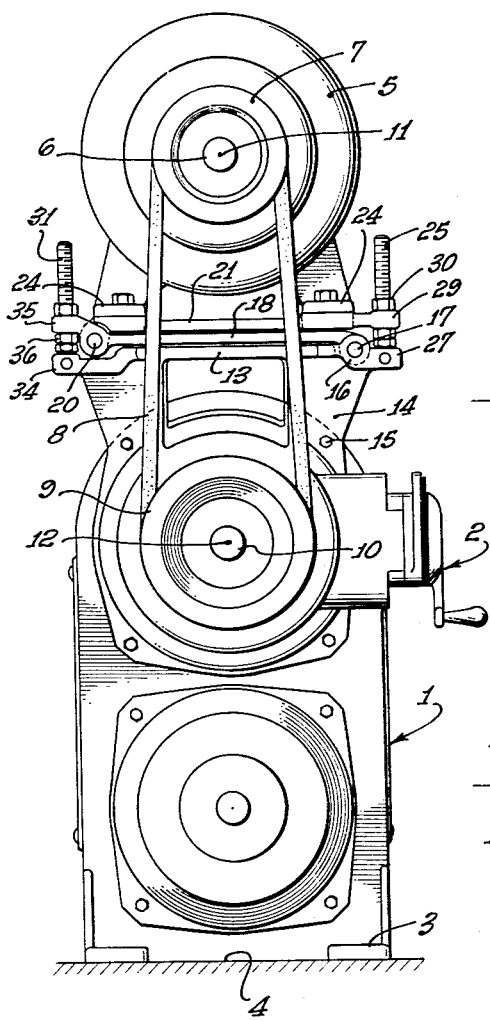
Figure 1 is a front elevation of a power unit in which the base structure forming the invention is incorporated.

An enclosed variable ratio transmission mechanism is provided with means for varying its ratio, as by an adjusting wheel 2. This variable ratio transmission mechanism has a base 3 adapted to be mounted upon a floor 4. This variable ratio transmission mechanism 1 is driven by an electric motor 5 shown, in this instance, as mounted vertically above the variable ratio transmission mechanism and having a shaft 6. Upon the shaft 6 there is mounted a multiple-belt pulley 7.

The pulley 7 is shown in this instance as driving a number of belts 8 passing over a pulley 9 mounted on an input shaft 10 of the variable ratio transmission mechanism 1.

It is considered unnecessary to describe the structure of the pulleys or the belts or the transmission mechanism since they are well-known. One form of such devices is shown and described in a copending application assigned to the same assignee as this application, and filed in the name of Thomas G. Myers on January 28, 1957, under Serial No. 636,618, bearing the title: "Variable Ratio Transmission Mechanism."

The present invention is concerned with the manner in which the motor 5 is adjustably supported. By the aid of this supporting structure, the center distance between the axis 11 (Fig. 1) of the motor 5 and the axis 12 of the driven shaft 10 may be varied, in order to make it possible to tighten the belts 8 as they wear, or to reduce the center distance for the purpose of removing and replacing the belts 8.

For this purpose, a three-part base structure is provided. The lowermost part or base member 13 is formed integrally with a bracket 14. This bracket may be mounted as by bolts 15 upon the frame or casing of the variable ratio transmission device 1.

Located at the right-hand edge of the lowermost member 13 are a pair of bearing bosses 16. These bearing bosses are disposed at the opposite front and rear edges of the base member 13. Through these bosses extends a pivot pin 17 appropriately fixed against axial movement. Pivotally mounted upon the pin 17 is an intermediate base member or part 18, which is folded over the lowermost member 13 and which can be angularly adjusted to form an acute angle with member 13, as indicated in Fig. 3. As will be explained hereinafter, the angular adjustment may be maintained until a different adjustment is desired. For providing this pivotal connection, the base member 18 is provided with a pair of spaced bosses 18a so arranged as to limit relative axial movement along pin 17 between the base members 13 and 18.

At the left-hand edge of the intermediate member 18 there are provided the integrally formed bearing bosses 19 (see particularly Fig. 4). These bearing bosses are located at the front and rear edges of the member 18 and accommodate a pivot pin 20. Pivoted upon pivot pin 20, as by the aid of bosses 22 (Fig. 4), is the uppermost base member 21. This member 20 overlies the base member 18 and may form an acute angle therewith as indicated in Fig. 3; alternatively, it may lie substantially parallel with the base member 18 in the collapsed position shown in Figs. 1 and 2.

There are thus provided serially and pivotally joined base members 13, 18 and 21. By appropriate angular adjustment of the base members with respect to each other, the center distance between the axes 11 and 12 may be adjusted for tightening or loosening the belts 8 or for facilitating their removal and replacement. The zig-zag configuration of the linked members 13, 18 and 21 makes it possible to provide a very substantial center distance adjustment; the base members being foldable one over the other, are compactly arranged.

The uppermost base member 21 is provided with pads 23 (Fig. 3) to which may be bolted the feet 24 of the motor 5, as by bolts 24a.

Figure 2:
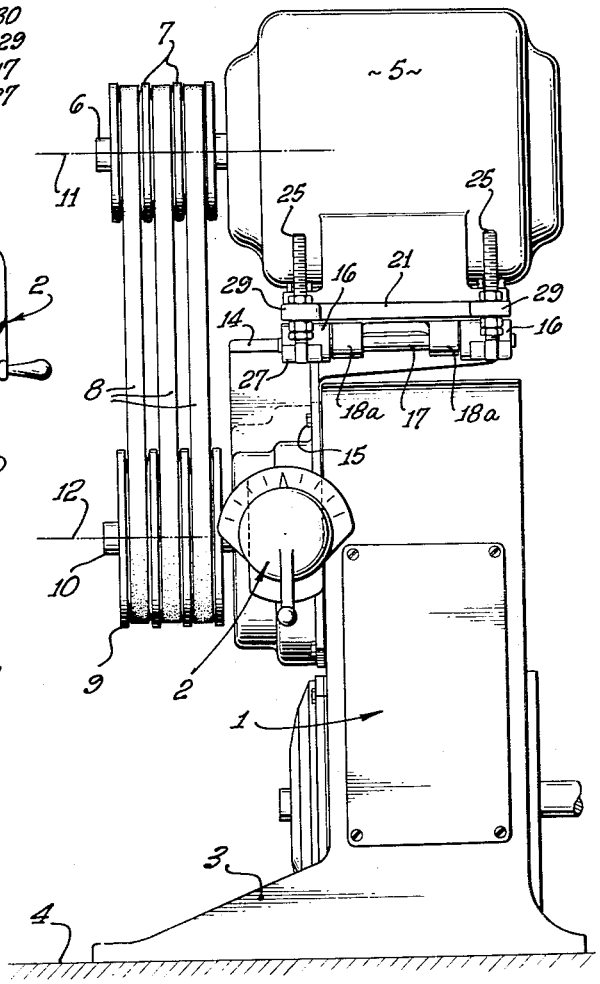
Fig. 2 is a side elevation thereof.

In order to maintain the relative angular adjustments of the members 13, 18 and 21, use is made in this instance of three threaded studs. Two such threaded studs 25, shown most clearly in Figs. 2, 3 and 4, are pivoted at their lower ends on pins 26 mounted in the bifurcated bosses 27. These bifurcated bosses 27 are formed integrally with the base member 13 and are arranged at the right-hand side of this base member.

The head 28 of each of the studs 25 is formed with flat sides to be accommodated between the bifurcations of the bosses 27.

The studs 25 pass through clearance apertures in ears 29 formed integrally with the base member 21 and adjacent the right-hand edge of the base 21. The angular adjustment of the base 21 therefore with respect to the other base members may be effected by the aid of nuts 30 mounted upon the studs 25 and disposed both above and below the ears 29. Obviously, by appropriate adjustment of the nuts 30, the angular position of the base 21 may be maintained with respect to the pivot pin 20 upon which the base member 21 is mounted. Studs 25 with nuts 30 operate as struts between base member 21 and member 13. The ears 29 thus form rests for the strut structure.

Similarly, the angular position of member 18 with respect to pin 17 may be adjusted by a stud 31 provided at the left-hand end of the stationary base member 13. This stud 13 has a flattened head 32 pivotally mounted on the pin 33. The flattened head 32 is disposed between the bifurcations of the boss 34 integrally formed at the left-hand edge of the base member 13. The stud 31 passes through a clearance aperture in an ear 35 formed integrally at the left-hand edge of the base section 18. Nuts 36 determine the position of the base member 18 with respect to the base member 13. Thus the studs 31 and nuts 36 operate as a strut between members 13 and 18; an ear 35 serves as a rest for the strut structure.

By the aid of the concatenated base sections 13, 18 and 21, the position of the axis 11 of the motor 5 can be adjusted. In this adjustment, the axis 11 does not materially depart from a position vertically above the axis 12.

The inventor claims:

1. A base for supporting an electric motor having a shaft and a driving pulley mounted on the shaft; said base comprising a series of supporting members in overlying relation, and serially and pivotally joined together, one end member of the series being fixed, the other end member of the series providing a base for the motor, and means for maintaining the members in any angularly adjusted position about their pivot axes, including an ear carried adjacent an edge of said other end member of the series; an ear carried by that member which is pivoted to the other edge of said other end member; threaded studs each having a free end respectively adjustably mounting said ears; and means for pivotally mounting the other ends of the studs, said ears having clearance apertures to accommodate the threaded ends of the studs.

2. In a base supporting structure: a series of three supporting members in overlying relation, and serially and pivotally joined together to form adjacent angles; one end member serving as a base, and the other end member being stationary; an ear carried adjacent an edge of said one end member of the series; an ear carried by the intermediate member that is pivoted to the other edge of said one end member; said ear being located at that end of the intermediate member which is pivoted to said base member; bosses located at opposite edges of the other end member; threaded studs each having a free end respectively adjustably mounting said ears; and means for pivotally mounting the other ends of the studs respectively in said bosses, said ears having clearance apertures respectively to accommodate the threaded ends of the studs.

References Cited in the file of this patent

UNITED STATES PATENTS

| 1,293,264 | Waltz | Feb. 4, 1919 |
| 1,457,982 | Makower | June 5, 1923 |
| 1,708,903 | Schroder | Apr. 9, 1929 |
| 2,511,445 | Ruemelin | June 13, 1950 |
| 2,568,290 | Mountain et al | Sept. 18, 1951 |
| 2,669,404 | Howard | Feb. 16, 1954 |